(12) United States Patent
Suzuki et al.

(10) Patent No.: US 7,199,496 B2
(45) Date of Patent: Apr. 3, 2007

(54) INTEGRATED ELECTRIC MOTOR AND DRIVE, OPTIMIZED FOR HIGH-TEMPERATURE OPERATION

(75) Inventors: Seiki Suzuki, Ibaraki (JP); Yasuo Sato, Ibaraki (JP); Akihiko Hoda, Ibaraki (JP); Chikara Sugawara, Ibaraki (JP); Yoshinari Araki, Chiba (JP); Eiji Oi, Chiba (JP); Hung D. Vu, Pembroke, MA (US)

(73) Assignee: Oriental Motor Boston Technology Group Incorporated, Braintree, MA (US)

( * ) Notice: Subject to any disclaimer, the term of this patent is extended or adjusted under 35 U.S.C. 154(b) by 0 days.

(21) Appl. No.: 11/037,858

(22) Filed: Jan. 18, 2005

(65) Prior Publication Data

US 2006/0158049 A1    Jul. 20, 2006

(51) Int. Cl.
- H02K 11/00 (2006.01)
- H02K 1/23 (2006.01)
- H02K 9/00 (2006.01)
- H02K 3/24 (2006.01)
- H02K 5/00 (2006.01)

(52) U.S. Cl. .................. 310/68 R; 310/64; 310/52
(58) Field of Classification Search .............. 310/52, 310/68 R, 89, 65, 53
See application file for complete search history.

(56) References Cited

U.S. PATENT DOCUMENTS

| | | | | |
|---|---|---|---|---|
| 3,102,571 A | * | 9/1963 | Scott | 411/301 |
| 3,780,795 A | * | 12/1973 | Arnold | 165/80.2 |
| 4,668,890 A | * | 5/1987 | Swingler | 313/105 R |
| 4,724,347 A | * | 2/1988 | Reinhardt et al. | 310/68 R |
| 4,810,917 A | * | 3/1989 | Kumar et al. | 310/68 R |
| 4,963,778 A | * | 10/1990 | Jensen et al. | 310/89 |
| 5,068,555 A | * | 11/1991 | Oberdorfer-Bogel | 310/52 |
| 5,532,533 A | * | 7/1996 | Mizutani | 310/68 B |
| 5,714,816 A | * | 2/1998 | Jensen et al. | 310/89 |
| 5,834,739 A | * | 11/1998 | Lockwood et al. | 219/468.1 |
| 5,960,535 A | * | 10/1999 | Rubens et al. | 29/832 |
| 6,198,183 B1 | * | 3/2001 | Baeumel et al. | 310/52 |
| 6,229,232 B1 | * | 5/2001 | Roth-Stielow et al. | 310/52 |
| 6,297,572 B1 | * | 10/2001 | Sunaga et al. | 310/68 R |
| 6,479,916 B1 | * | 11/2002 | Bobay et al. | 310/89 |
| 6,836,036 B2 | * | 12/2004 | Dube | 310/68 R |
| 2002/0158524 A1 | * | 10/2002 | Bobay et al. | 310/68 R |
| 2003/0067228 A1 | * | 4/2003 | Vanjani | 310/64 |
| 2003/0230942 A1 | * | 12/2003 | Okubo et al. | 310/89 |

FOREIGN PATENT DOCUMENTS

GB    2028006 A  *  2/1980

\* cited by examiner

*Primary Examiner*—Burton S. Mullins
*Assistant Examiner*—Erik Preston
(74) *Attorney, Agent, or Firm*—Ira S. Dorman

(57) ABSTRACT

The heat-generating components of an integrated motor system are disposed proximate the motor body, for efficient heat dissipation, and the heat-sensitive components are segregated therefrom, physically and thermally.

38 Claims, 3 Drawing Sheets

INTEGRATED ELECTRIC MOTOR AND DRIVE, OPTIMIZED FOR HIGH-TEMPERATURE OPERATION

BACKGROUND OF THE INVENTION

The thermal sensitivity of certain electronic components employed in contemporary integrated motor systems imposes limits upon the maximum temperature of operation, and thereby precludes optimal performance. Electronic power switching devices, resistors, and like components add significantly to the quantity of heat that is generated by the motor itself, and the problem is exacerbated in small integrated motor systems where the space available within the housing is very limited (typically in the range of about four to five cubic inches, for NEMA size 23 motors to about 10 cubic inches for NEMA size 34 motors).

These factors are not adequately addressed in conventional integrated motor systems. All electrical components, including for example heat-generating MOSFETs and heat-sensitive microprocessors (and other integrated circuit devices), are typically contained in a common, closed space defined within the motor drive housing, and the parts and components of the system are not positioned for optimal transfer and dissipation of heat.

The prior art does however recognize the desirability of providing cooling effects in integrated motor systems of the kind to which the present invention is directed. Japan Publication No. 60-166264 (Application No. 59-55238) provides a step motor in which a fan is mounted on the motor shaft in the driver housing, for the purpose of cooling drive circuit components. It will be appreciated that the space and structural requirements for accommodating and adequately supporting a fan necessarily and substantially increase the size and weight of the overall system, thereby making the arrangement of the Japanese publication particularly unsuitable for use in small, integrated motor systems.

SUMMARY OF THE INVENTION

It is the broad object of the present invention to provide an integrated motor system wherein and whereby performance is optimized by improved management of heat transfer and dissipation.

A more specific object of the invention is to provide a relatively small and compact, integrated step, servo, or hybrid motor system having such attributes.

It has now been found that the foregoing and related objects of the invention are broadly attained by the provision of a system comprised of a motor and an integrated driver, wherein at least one heat-generating electrical component of the system for delivering electric current to the motor is disposed in effective heat-conductive contact with the motor body, and at least one heat-sensitive electrical component (typically, a control component) is disposed remote from the motor body. All heat-generating components incorporated in the motor system will normally produce, cumulatively, a quantity of heat equivalent to at least about 10 percent of the power delivered to the system, and each heat-sensitive component will normally have a maximum temperature of 100° C., and more typically about 85° C.

Thermal insulating means is advantageously interposed effectively between the heat-sensitive control component(s) and the heat-generating component(s). Such insulating means will generally comprise (a) structure defining a substantially dead air space and/or (b) a radiation-reflective surface (e.g., of an interposed sheet, film or foil) constructed and disposed to reflect thermal energy away from the protected heat-sensitive component or components.

The motor system of the invention will usually include a first housing, substantially enclosing the heat-generating component or components, and an effectively separate second housing substantially enclosing the heat-sensitive component or components, both housings desirably being fabricated from a material (usually, a synthetic resinous material) of relatively low thermal conductivity. The heat-generating component(s) will normally comprise an electronic power-switching device (e.g., a metal oxide semiconductor field effect transistor [MOSFET], an integrated gate bipolar transistor [IGBT], an integrated power module [IPM], or a bipolar transistor), as well as a current-sensing resistor, a power resistor, or both. Generally, all of the heat-generating components utilized in the motor system will desirably be mounted upon a common mounting board, which will advantageously be operatively attached to the motor and fabricated from a metal of high thermal conductivity (e.g., aluminum) so as to more efficiently distribute and dissipate heat and thereby avoid hot spots; other standard PCB substrates, such as for example fiber glass-filled epoxy, can also be employed, but usually with somewhat less thermal advantage.

The heat-sensitive components will normally comprise a microprocessor (CPU) and at least one other integrated circuit (IC) control device (e.g., a complex programmable logic device [CPLD], an operational amplifier or DC/DC converter [comprising a regulator IC, an inductor, a capacitor, and a diode], etc.). The IC devices used in industrial products (like the present motor system) will usually have rated maximum operating temperatures, imposing a maximum ambient temperature limitation within the corresponding enclosure to provide an adequate margin of safety in respect of the thermal shut-down point; for example, when the maximum temperature of effective operation (rated temperature) of the most heat-sensitive component is 85° C., the maximum ambient temperature limitation would typically be about 75° to 80° C.

The heat-generating component(s) and the heat-sensitive component(s) will preferably reside in sections of the motor system that are effectively separated to substantially isolate those two classes of components, physically and thermally, from one another. A plurality of heat-conductive elements, such as thermal pads or the like, arranged among those sections, the several electrical components, the motor body, and the housing parts, will desirably be provided to increase conductive heat transfer away from the vicinity of the protected control component(s).

DETAILED DESCRIPTION OF THE PREFERRED AND ILLUSTRATED EMBODIMENTS

Figure 1:
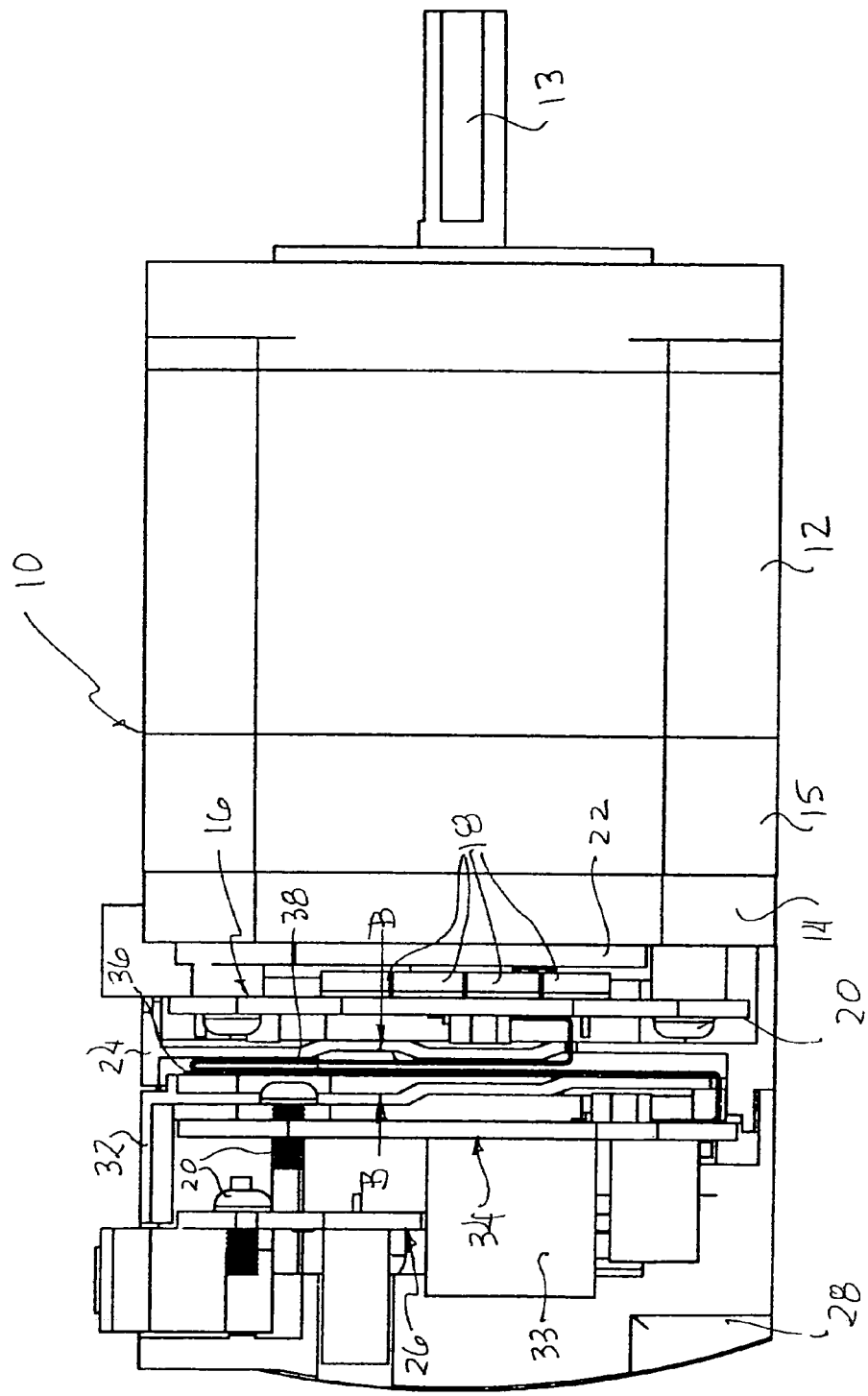
FIG. 1 is an elevational view of an integrated step motor system embodying the present invention, housing components being broken away to expose internal features.
Figure 2:
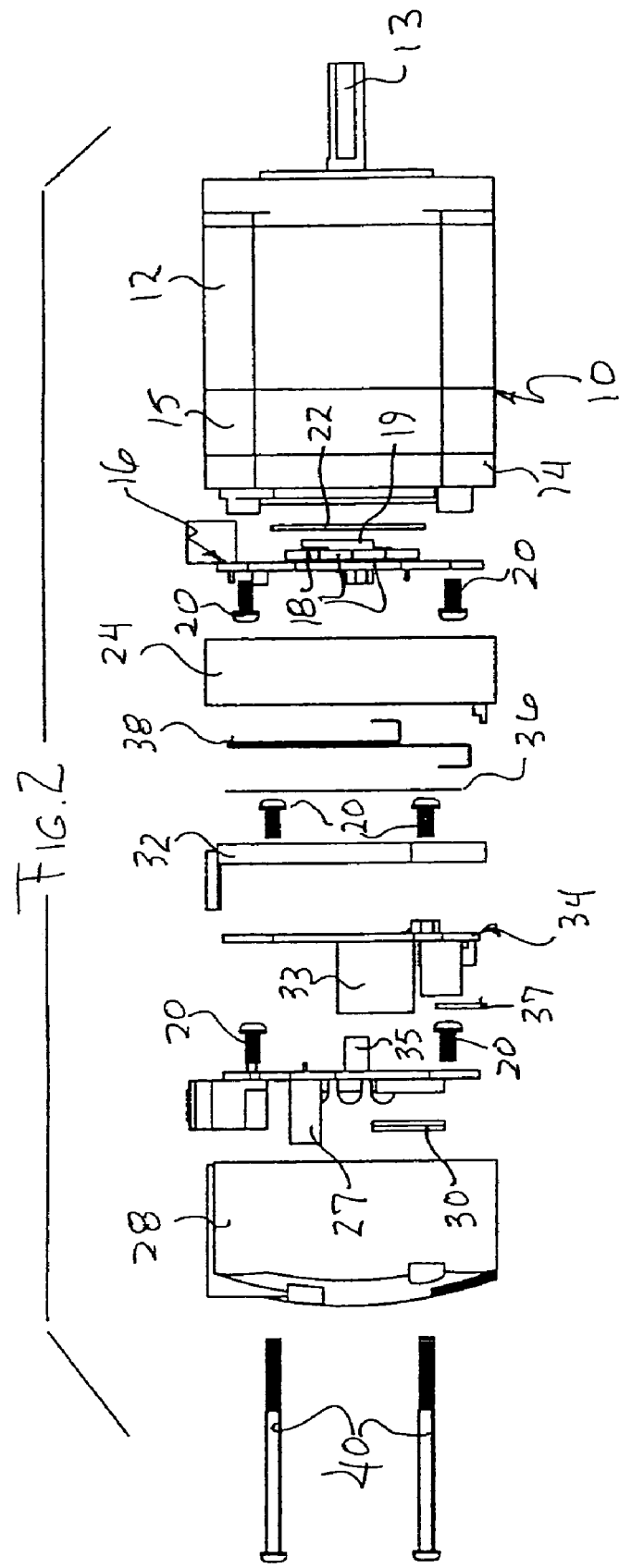
FIG. 2 is an exploded elevational view of the motor system of FIG. 1, drawn to a reduced scale.
Figure 3:
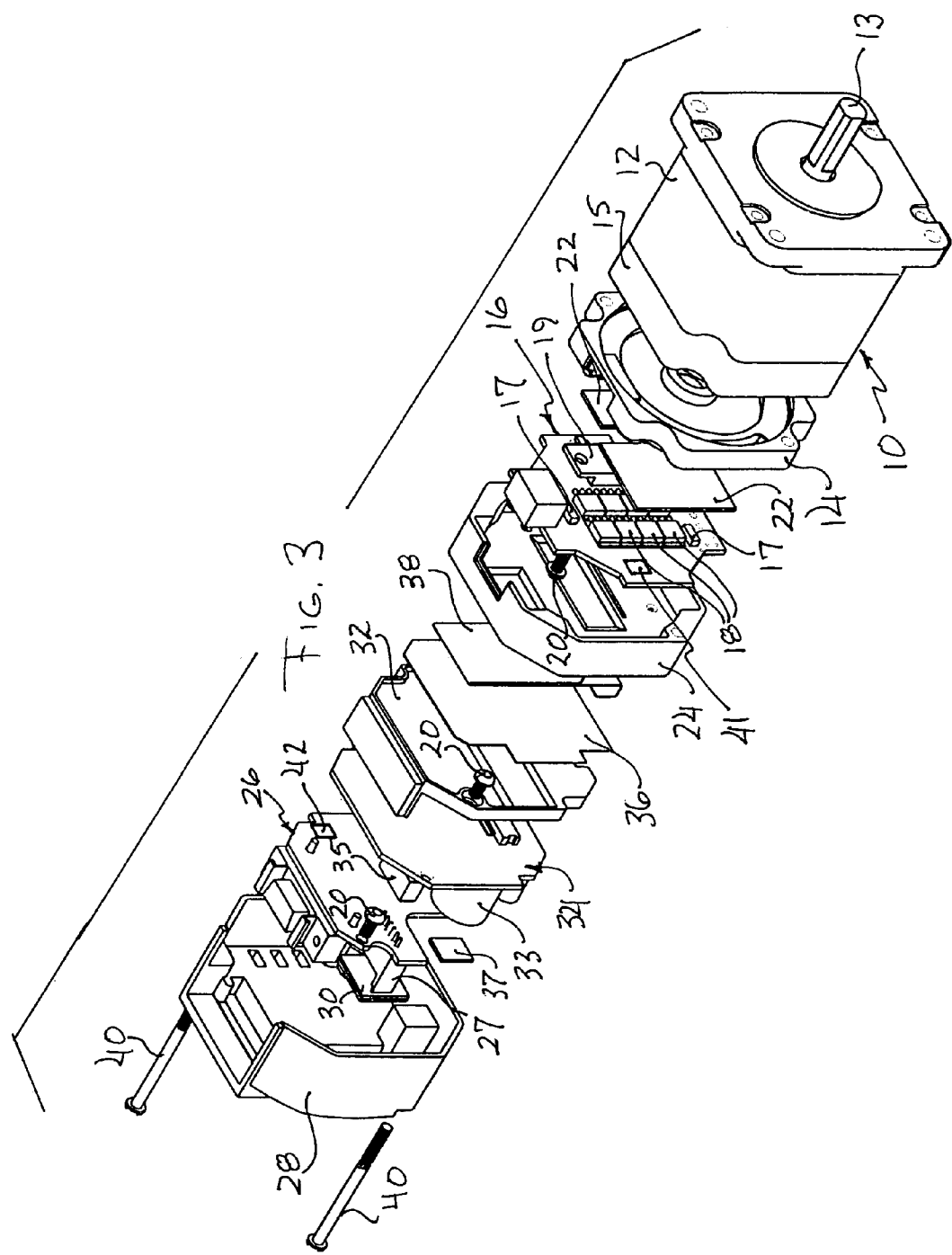
FIG. 3 is an exploded perspective view thereof.

Turning now in detail to the appended drawings, therein illustrated is an integrated step motor system embodying the present invention and including a motor and sensor assembly, generally designated by the numeral 10, and an adjacent sensor cover 14. The motor includes a body (stator) 12 housing a rotor, the shaft 13 of which is visible, and the assembly includes a sensor housing 15, attached to the motor body. The foregoing components are commonly regarded to together constitute the motor of the system.

A printed circuit (PC) board, generally designated by the numeral 16, mounts an array of MOSFETs 18 (typically eight) and current-sensing resistors 17 (typically two), as well as a power resistor 19 (which is optional, and may be installed externally to dissipate energy regenerated under heavy braking loads). The board 16 (sometimes referred to herein as the "MOSFET board") is assembled to the sensor cover 14 by screws 20, and thermal pads 22 are interposed for the efficient conduction of heat to the motor body 12, via the sensor cover 14, which thus functions as a heat sink for dissipation of thermal energy generated by the MOSFETs and resistors 17, 18, 19; a cover or housing 24 is disposed over the board 16 and thermal pads 22. As previously noted, in conventional integrated motor systems the heat-generating components 17, 18, 19 are typically mounted on a common PC board together with heat-sensitive components.

An outwardly disposed control board, generally designated by the numeral 26, mounts the microprocessor (CPU) 27 for the motor system, and is secured by screws 20 to the driver case 28. A thermal pad 30 is disposed between the control board 26 and the driver case 28, and helps to protect the microprocessor 27 against overheating. Driver housing 32 is affixed by screws 20 to the driver case 28, and cooperatively encloses both a second, inwardly disposed control board 34 and also the outward control board 26, which boards are electrically interconnected by a multielement metal connector 35.

A relatively large thermal pad (not shown) may be placed between the control boards 26, 34 to cooperate with the pad 30 in conducting heat to the driver case 28; temperature reductions of 3° to 4° C. can be realized through the use of such pads. Also, a small thermal pad 37 is disposed between the power regular integrated circuit (mounted on the back of the inward board 34, and not visible) and the inside wall of the driver case 28 (through the cutout shown formed in the board 26), for the purpose of conducting heat away from the regulator integrated circuit; an aluminum capacitor 33, serving as a line voltage filter, is also mounted on the back of the board 34.

A heat-reflective sheet 36 of aluminum is disposed within the space B—B, defined (as indicated by the facing arrows in FIG. 1) between the MOSFET board cover 24 and the driver housing 32. A flexible ribbon cable 38 is disposed within the same space B—B, and serves to electrically interconnect the MOSFET board 16 and the inward control board 34. As compared to more conventional electrical connectors, the ribbon cable 38 serves to reduce heat conduction from the motor and the heat-generating components on the MOSFET board 16, and contributes significantly to lowering of the temperature (typically, by 2° to 3° C.) within the driver case 28. On the other hand, it is desirable to electrically interconnect the boards 26, 34 by use of a metal connector (such as the part 35), to promote heat flow to the driver case (from which it can be dissipated) and thereby contribute further to reduction of the temperature therewith. As will be noted from the drawings, the dead air space B—B is devoid of any heat-sensitive electrical component and of any heat-generating electrical component.

The several driver-housing parts, and the driver component mounting boards, are secured to the motor (sensor housing and motor body) by two long screws 40, which are desirably of plastic construction to minimize heat flow from the motor and from other heat-generating components; substituting plastic screws for metal ones can reduce the ambient temperature within the driver case by 2° to 3° C.

A first temperature sensor 41 is mounted on the MOSFET board 16 and serves essentially to sense the temperature of the motor, and a second temperature sensor 42 is mounted on the control board 26 and serves essentially to sense the temperature within the driver case 28. Signals from both sensors 41, 42 are fed to the CPU 27, so that a visual or audible alarm can be activated, or other suitable action can be initiated automatically, when a user-programmed threshold temperature for either the motor section (e.g., 105° C.) or the driver section (e.g., 80° C.) has been reached. It might be noted that it is conventional, in motor systems of this kind, to monitor the driver area temperature. Because the motor and driver sections of the present motor are physically and thermally isolated from one another, however, separate monitoring of the ambient temperatures within each section is readily effected, and optimal control and protection against overheating is thereby afforded.

The motor body 12, the sensor cover 14, sensor housing 15, and the driver case 28 will normally be made of a metal (typically, the stator will be of laminated steel construction, and the other parts will be made of aluminum), inherently affording relatively high levels of thermal conductivity and thus good heat-conduction and dissipation qualities. Conversely, the MOSFET board cover 24 and the driver housing 32 will normally be made of a synthetic resinous material (such as polybutylene terephthalate), inherently affording relatively low levels of thermal conductivity and thus good heat-insulating qualities.

As will be appreciated, the motor system described embodies a number of features that serve to regulate and control the transmission and dissipation of thermal energy, so as to maintain the heat-sensitive components below a prescribed upper temperature limit. It will also be appreciated that, while the features disclosed function most effectively in combination and are believed to complement one another synergistically, each of them can be employed alone or in such subcombinations as will most suitably promote attainment of the objects of the invention in any given instance.

Thus (and with reference to the foregoing disclosure), in one implementation of the invention the power switching devices employed (e.g., an array of MOSFETs) are mounted upon a MOSFET board that is separate from the control boards and is displaced therefrom to a position spaced directly adjacent the motor/sensor assembly, whereas such power switching devices are normally mounted on a power board located directly adjacent the control board (on which the CPU and other integrated circuit devices are mounted). In tests carried out using integrated step motor systems that were otherwise identical (wherein all components and printed circuit boards, exclusive of the motor and the MOSFET board, occupied an enclosed volume of about four cubic inches), temperature measurements were made at various locations after running the motors for 1.5 hours at 30 rpm and the full, rated current. As compared to the conventional configuration described, significant decreases in temperature were noted in the system embodying the invention, measured in the vicinity of the MOSFETs, the capacitor, the control boards, the CPU, and the exterior and fin of the driver case; temperature increases were noted only in the motor wire and end cap.

Other tests were made after reconfiguring the conventional integrated motor system described by moving the current-sensing resistor and the power resistor from the power board to the separate MOSFET board. Doing so was found to reduce substantially the temperatures that developed within the driver enclosure.

Constructing the motor system housings to provide spacing between the motor/sensor assembly and the driver section structure, so as to thereby define a dead air space (which, it should be appreciated, can be peripherally open, if so desired) in which substantially no convective heat flow occurs, was found to effect significant temperature reductions. Fabrication of the MOSFET board cover from a synthetic resinous material was also found to contribute significantly to the heat-insulating effect.

Finally, tests performed on an integrated system in which a reflective aluminum sheet was interposed between the motor/sensor assembly and the driver section demonstrated that an additional, substantial heat-insulation effect is produced thereby. As noted previously, the reflective element may take any form that is effective for directing infrared radiation away from some or all of the heat-sensitive components; it may for example constitute a polished or plated structural part of the system, or a reflective sheet, a vacuum-metallized film, or a metal foil. As noted above, the use of a flexible ribbon cable, for connecting the MOSFET board to the control board, is also found to desirably reduce heat transfer, as compared to conventional motor systems in which pluggable connectors, comprised of numerous rigid metal pins, are employed.

In general, by providing a separate "power" board for the power switching devices and other components that generate substantial quantities of heat (which usually are functionally part of the drive electronics), and by physically locating the power board proximate the motor, heat is efficiently dissipated through the motor body. This, and the establishment of a non-convective air layer between heat-sensitive components and heat-generating components, and the interpositioning of a surface that efficiently reflects infrared radiation, all serve to regulate and direct thermal energy flow and/or transmission (generally, from the driver side to the motor side of an integrated system having two main sections), and thus to reduce temperatures in the vicinity of the drive circuit components that are susceptible to overheating. Effectively, the motor body is used as a heat sink and thermal radiator, and the heat-sensitive components are segregated from the heat-generating components. As a result, the practical operating range of the motor system is extended, and optimized performance is, in turn, enabled.

Separating the power-switching devices (MOSFETs) and other heat-generating components from the heat-sensitive components of the system also minimizes the amount of heat that must be dissipated by the driver case, and in turn permits its size to be minimized. The ability to so reposition the MOSFETS and other heat-generating components is feasible because of the complementary heat-generating properties of the motor and MOSFETs at different speeds. Thus, it is well known that that amount of heat produced by a motor increase with increasing motor speed, and that, conversely, the amount of heat produced by the power switching devices decreases with increasing motor speed. As a result, the motor/sensor housing assembly, functioning as a heat sink, is not required to dissipate simultaneously the maximum amount of heat that is generated by both the motor and also the electronic heat-generating components of the system.

It will be appreciated that the concepts of the present invention are applicable to virtually any motor system that employs an integrated electrical driver in which at least one heat-generating component and at least one heat-sensitive component is included, and in which the heat-sensitive component imposes an upper limit upon the temperature of operation. In this regard, it will be understood that microprocessors and other ICs (all of which are usually heat-sensitive) generally produce some heat during operation; the quantities of heat involved are not significant, however (typically not exceeding about one Watt, as compared to the 12 Watts or so typically generated by the MOSFETs and current-sensing resistors), and heat generated by the ICs does not therefore impose constraints upon the operation or performance of the motor system. Also, while some components, such as the input voltage-stabilizing capacitor referred to above (which is typically rated for operation at about 105° C.), do not normally establish thermal shut-down limitations, maintaining them at relatively low temperatures will help to retard chemical aging and thereby to maximize their useful lives.

Albeit the nature of the electronic control employed in the system may vary widely, and does not represent a restriction upon the scope of the present invention, one suitable control arrangement, that can beneficially be employed, is disclosed in Hoda et al. U.S. Pat. No. 6,121,744, the entire specification of which is incorporated hereinto by reference thereto. Suffice to say that Hoda et al. disclose position control apparatus for an integrated motor system comprised of a position detecting section, for detecting rotor position; a control section, for comparing an output signal of the position detecting section with a command position signal, and for outputting a signal corresponding to an electric current that is to flow in windings of the motor, based upon deviations between the output signals and the command position signal; and a drive section, for outputting an electric current that is to be supplied to the windings of the motor, based upon an output signal of the control section, and for controlling the position of the motor based on the command position signal. The control section outputs a sine-wave data signal, corresponding to the command position signal, from a sine-wave data table, when the deviation lies within an electrical angle of 90°; and it outputs a sine-wave data signal, from the sine-wave data table, which excites the motor in such a way that the motor comes to an excitation stable point leading the rotor position by an electrical angle of 90°, when the deviation exceeds an electrical angle of 90°.

Perhaps it should be emphasized that, as used in the art, references to the "driver" and its components include both the heat-generating electronic "drive" components and also the heat-sensitive electronic "control" components. It is the integration of the electronic driver section (which controls and effects the delivery of current to the motor) with the motor section that causes the system described to be characterized as an "integrated motor system."

Thus, it can be seen that the present invention provides an integrated motor system wherein and whereby performance is optimized by improved management of thermal energy flow and dissipation. More specifically, it provides a relatively small and compact, integrated step, servo, or hybrid motor having such attributes. The transfer of thermal energy to the heat-sensitive components, by radiation, convention and conduction mechanisms, is reduced through the incorporation into the motor system of reflective elements, dead-air space, and/or parts and elements that are selectively fabricated from materials of high or low thermal conductivity.

Having thus described the invention, what is claimed is:

1. An integrated motor system comprised of a motor including a stator and a rotor within said stator; housing means attached in fixed position to said motor and defining a first chamber therewithin, lying adjacent to said motor, and a second chamber therewithin lying adjacent to said first chamber and remote from said motor, said motor, said first chamber and said second chamber being arranged seriatim in said motor system; thermal insulation means disposed between said first and second chambers; at least one heat-generating electrical component mounted on a mounting board contained in said first chamber of said housing means and operatively attached to said motor, said at least one heat-generating electrical component being disposed in effective heat conductive contact with said stator of said motor such that said stator functions as a heat sink for dissipation of thermal energy generated by said at least one heat-generating electrical component; and at least one heat-sensitive electrical component contained in said second chamber of said housing means; said thermal insulation means, so interposed, also being interposed between said at least one heat-sensitive electrical component and both said at least one heat-generating electrical component and also said motor to effectively thermally isolate said at least one heat-sensitive electrical component from said at least one heat-generating electrical component and said motor.

2. The motor system of claim 1 wherein said thermal insulating means comprises at least one of (a) structure defining a substantially dead air space that is devoid of any heat-sensitive electrical component and any heat-generating electrical component, (b) a radiation-reflective surface constructed and disposed to reflect thermal energy away from said heat-sensitive electrical component, and (c) at least one wall portion fabricated from a material of low thermal conductivity to afford good heat-insulating qualities.

3. The motor system of claim 2 wherein said insulating means comprises a radiation-reflective sheet, film or foil.

4. The motor system of claim 2 wherein said thermal insulation means comprises structure defining a substantially dead air space that is devoid of any heat-sensitive electrical component and any heat-generating electrical component.

5. The motor system of claim 2 wherein said thermal insulation means comprises at least one wall portion fabricated from a material of low thermal conductivity, to afford good heat-insulating qualities.

6. The motor system of claim 1 wherein said housing means comprises a first housing substantially enclosing said heat-generating electrical component, and a separate, second housing substantially enclosing said heat-sensitive electrical component.

7. The motor system of claim 6 wherein said first and second housings are fabricated from at least one material of low thermal conductivity to afford good heat-insulating qualities.

8. The motor system of claim 7 wherein said first and second housings are fastened to one another by use of fasteners of low thermal conductivity to afford good heat-insulating qualities.

9. The motor system of claim 8 wherein said fasteners are plastic screws.

10. The motor system of claim 1 wherein said at least one heat-generating electrical component is an electronic power-switching device.

11. The motor system of claim 10 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation 85° C.

12. The motor system of claim 11 wherein said at least one heat-generating electrical component additionally includes a current-sensing resistor, a power resistor, or both.

13. The motor system of claim 12 wherein all of the electrical components comprising said at least one heat-generating electrical component are mounted upon said mounting board.

14. The motor system of claim 1 wherein said at least one heat-sensitive electrical component is a microprocessor.

15. The motor system of claim 14 wherein said at least one heat-sensitive electrical component additionally includes an integrated circuit control device other than said microprocessor.

16. The motor system of claim 1 wherein said at least one heat-sensitive electrical component has a maximum temperature of effective operation of about 85° C.

17. The motor system of claim 1 additionally including a plurality of heat-conductive elements arranged among said chambers of said housing means and said motor for effective heat transfer away from the vicinity of said at least one heat-sensitive electrical component.

18. The integrated motor system of claim 1 comprised of a plurality of heat-generating electrical components, said heat-generating electrical components cumulatively producing a quantity of heat equivalent to at least about 10 percent of the power delivered to said motor system and being disposed in said first chamber and in effective heat-conductive contact with said stator such that said stator functions as a heat sink for dissipation of thermal energy generated by said heat-generating electrical components.

19. The system of claim 18 wherein said heat-generating electrical components are drive power components for delivering electric current to said motor, and wherein said at least one heat-sensitive electrical component is a control component.

20. The motor system of claim 1 additionally including a second mounting board mounting said at least one heat-sensitive electrical component, and a flexible ribbon cable operatively electrically interconnecting said first-mentioned and said second mounting boards.

21. The motor system of claim 1 wherein said at least one heat-generating electrical component comprises an electronic power-switching device and at least one of a current-sensing resistor and a power resistor, all of said heat-generating electrical components being mounted upon a common mounting board.

22. The motor system of claim 1 wherein said mounting board comprises a substrate fabricated from a metal of high thermal conductivity.

23. The motor system of claim 1 wherein said at least one heat-sensitive electrical component includes a microprocessor and at least one integrated circuit control device other than said microprocessor.

24. The motor system of claim 1 wherein said stator has a longitudinal axis, and wherein said first and second chambers are disposed on said longitudinal axis of said stator.

25. The motor system of claim 1 wherein said at least one heat-sensitive electrical component is disposed in heat-conductive contact with the structure of said housing means defining said second chamber such that said second chamber-defining structure functions as a heat sink for dissipation of thermal energy produced by said at least one heat-sensitive electrical component.

26. The motor system of claim 25 additionally including at least one heat-conductive element arranged for effective heat transfer from said at least one heat-sensitive electrical component to said second chamber-defining structure.

27. An integrated motor system comprised of a motor having a body; at least one heat-generating electrical component for delivering electric current to said motor; at least one heat-sensitive electrical component; and thermal insulating means effectively interposed between said heat-sensitive electrical component and said heat-generating electrical component, said insulating means comprising structure defining a substantially dead air space that is devoid of any heat-sensitive electrical component and any heat-generating electrical component.

28. The motor system of claim 27 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation of 85° C.

29. An integrated motor system comprised of a motor having a body; at least one heat-generating electrical component for delivering electric current to said motor; at least one heat-sensitive electrical component; and thermal insulating means effectively interposed between said heat-sensitive electrical component and said heat-generating electrical component, said thermal insulating means comprising a radiation-reflective surface constructed and disposed to reflect thermal energy away from said heat-sensitive component.

30. The motor system of claim 29 wherein said insulating means comprises a radiation-reflective sheet, film or foil.

31. The motor system of claim 29 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation 85° C.

32. An integrated motor system comprised of a motor including a stator and a rotor within said stator; housing means attached in fixed position to said motor and defining a first chamber therewithin, lying adjacent to said motor, and a second chamber therewithin lying adjacent to said first chamber and remote from said motor, said motor, said first chamber and said second chamber being arranged seriatim in said motor system; thermal insulation means disposed between said first and second chambers; at least one heat-generating electrical component mounted on a mounting board contained in said first chamber of said housing means and operatively attached to said motor, said at least one heat-generating electrical component being disposed in effective heat conductive contact with said stator of said motor such that said stator functions as a heat sink for dissipation of thermal energy generated by said at least one heat-generating electrical component; and at least one heat-sensitive electrical component contained in said second chamber of said housing means; said thermal insulation means, so interposed, also being interposed between said at least one heat-sensitive electrical component and both said at least one heat-generating electrical component and also said motor to effectively thermally isolate said at least one heat-sensitive electrical component from said at least one heat-generating electrical component and said motor; said motor system additionally including a first temperature sensor effectively disposed in said first chamber, a second temperature sensor effectively disposed in said second chamber, and monitoring means operatively connected to said temperature sensors for separately monitoring the ambient temperature within each of said chamber and for indicating when a temperature exceeding a selected value has been detected in one of said chambers.

33. The motor system of claim 32 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation 85° C.

34. An integrated motor system comprised of a motor having a stator; at least one heat-generating electrical component for delivering electric current to said motor; and at least one heat-sensitive electrical component, said heat-generating electrical component being disposed proximate said motor and in effective heat-conductive contact with said stator thereof such that said stator functions as a heat sink for dissipation of thermal energy generated by said heat-generating electrical component, and said heat-sensitive electrical component being disposed remote from said stator, said stator being of laminated steel construction.

35. The motor system of claim 34 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation 85° C.

36. An integrated motor system comprised of a motor having a body; at least one heat-generating electrical component for delivering electric current to said motor; at least one heat-sensitive electrical component; and thermal insulating means effectively interposed between said heat-sensitive electrical component and said heat-generating electrical component structure, said insulating means comprising structure defining a substantially dead air space that is devoid of any heat-sensitive electrical component and any heat-generating electrical component, said motor system additionally including at least one housing providing mutually spaced wall portions, and said dead air space being defined between said mutually spaced wall portions of said at least one housing.

37. The motor system of claim 36 wherein said mutually spaced wall portions are made of a synthetic resinous material that inherently affords relatively low levels of thermal conductivity and good heat-insulating qualities.

38. The motor system of claim 36 wherein said at least one heat-generating electrical component is an electronic power-switching device selected from the group consisting of metal oxide semiconductor field effect transistors, integrated gate bipolar transistors, integrated power modules, and bipolar transistors, and wherein said at least one heat-sensitive electrical component has a maximum temperature of effective operation 85° C.

* * * * *

UNITED STATES PATENT AND TRADEMARK OFFICE
CERTIFICATE OF CORRECTION

| | |
|---|---|
| PATENT NO. | : 7,199,496 B2 |
| APPLICATION NO. | : 11/037858 |
| DATED | : April 3, 2007 |
| INVENTOR(S) | : Seiki Suzuki et al. |

It is certified that error appears in the above-identified patent and that said Letters Patent is hereby corrected as shown below:

Column 8, "a" should be --said--; in column 10, line 8, "chamber" should be --chambers--; and in column 10, line 44, the word "structure" should not appear.

Signed and Sealed this

Nineteenth Day of June, 2007

JON W. DUDAS
*Director of the United States Patent and Trademark Office*